UNITED STATES PATENT OFFICE.

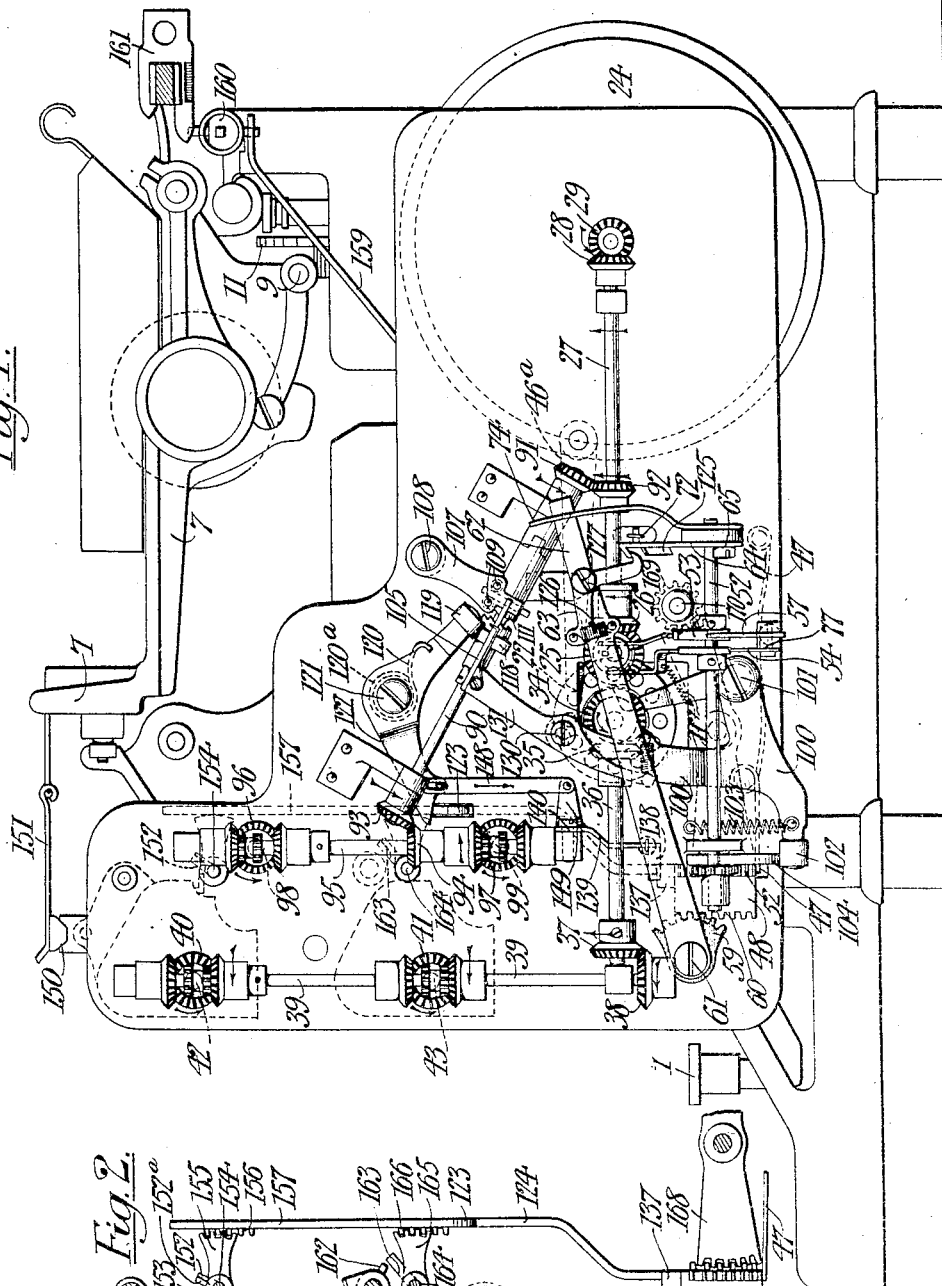

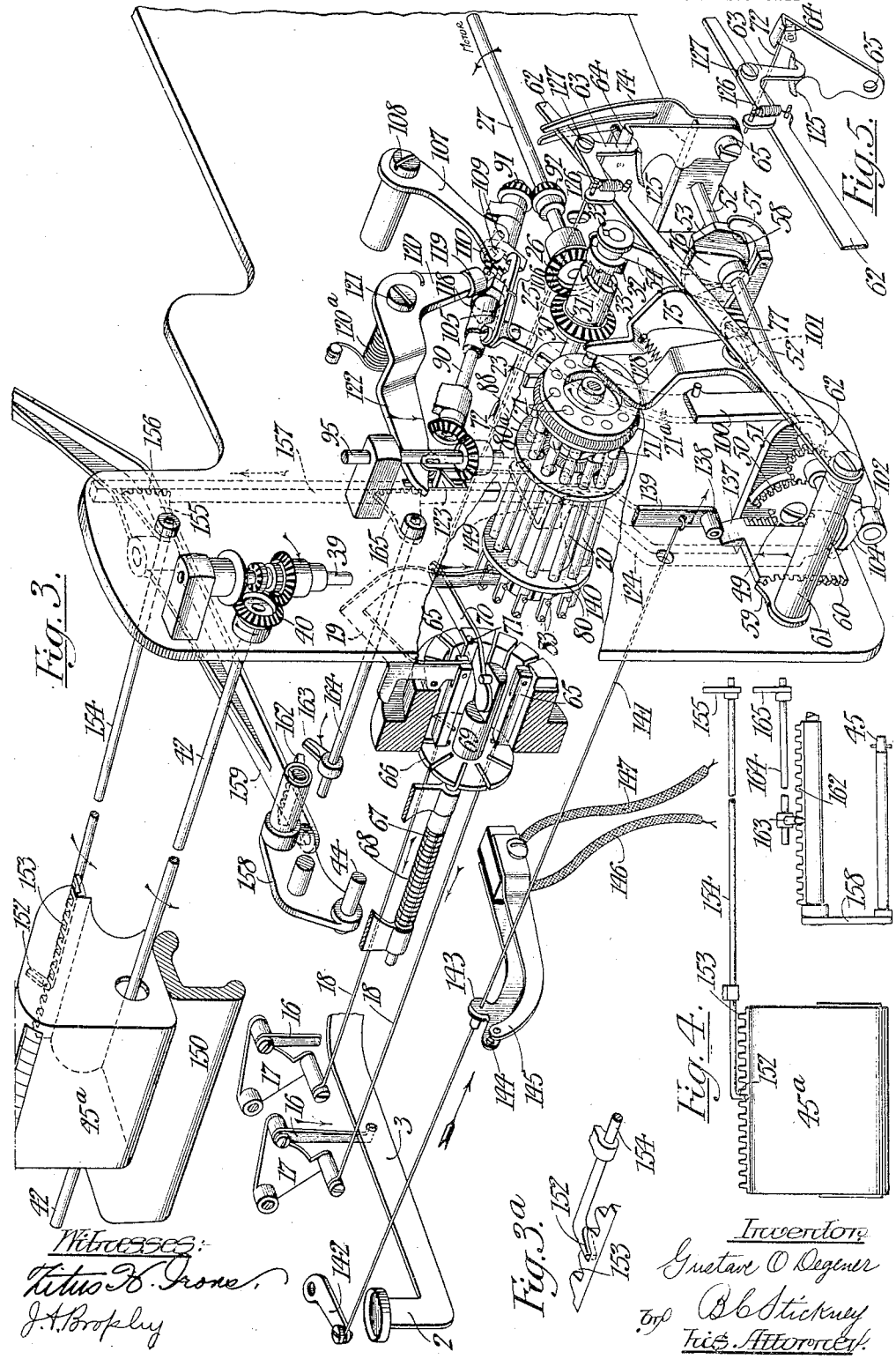

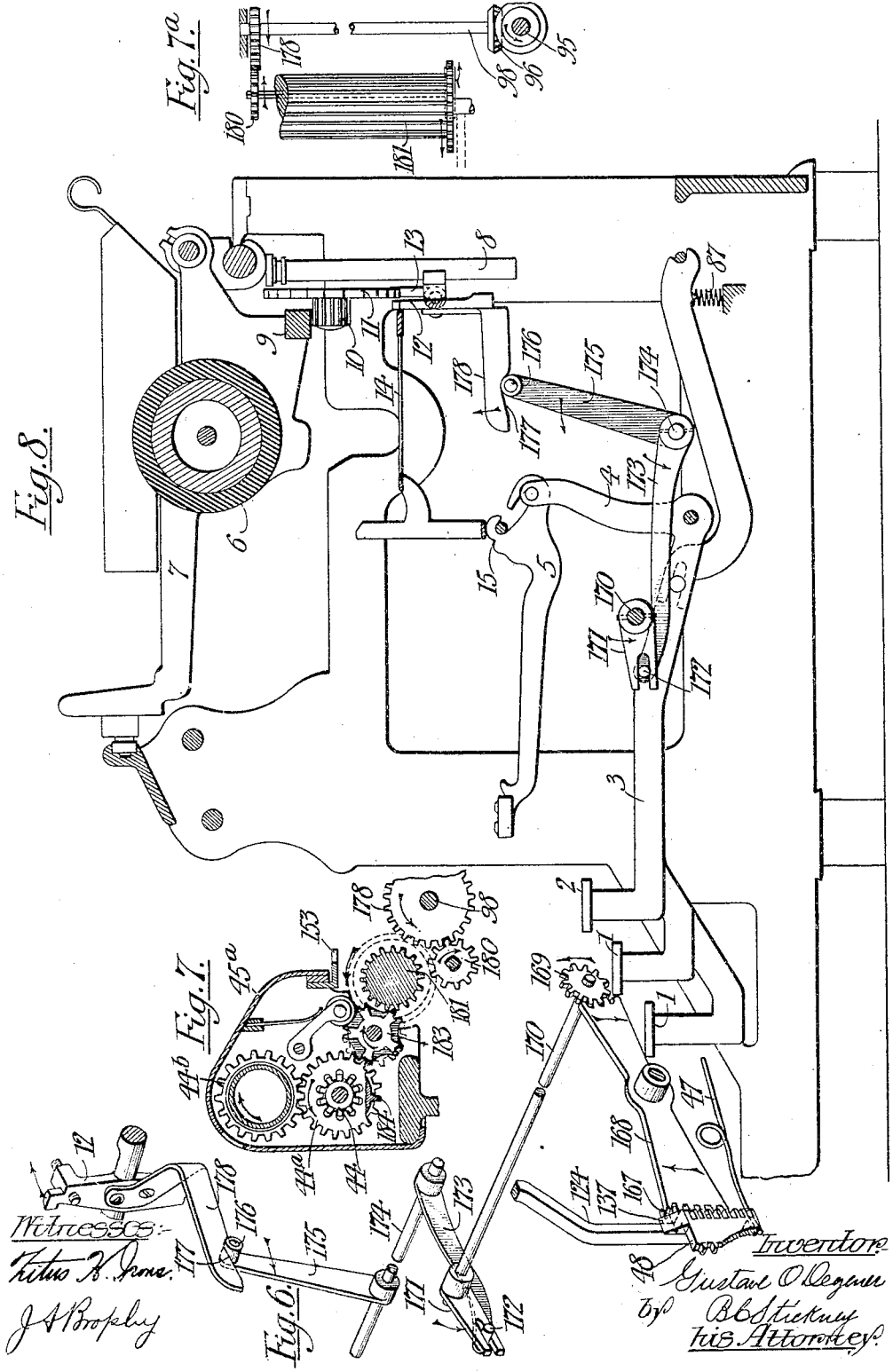

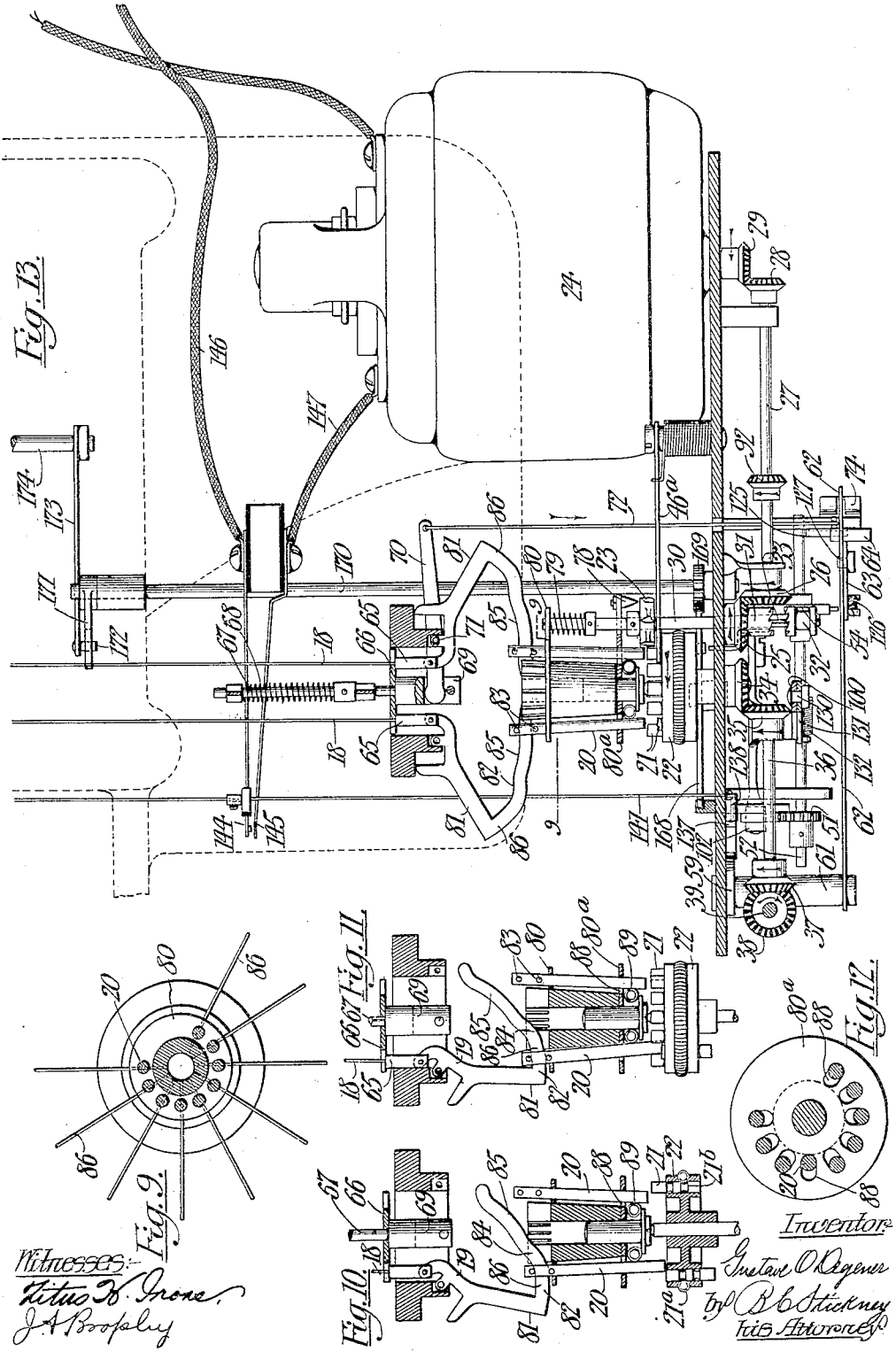

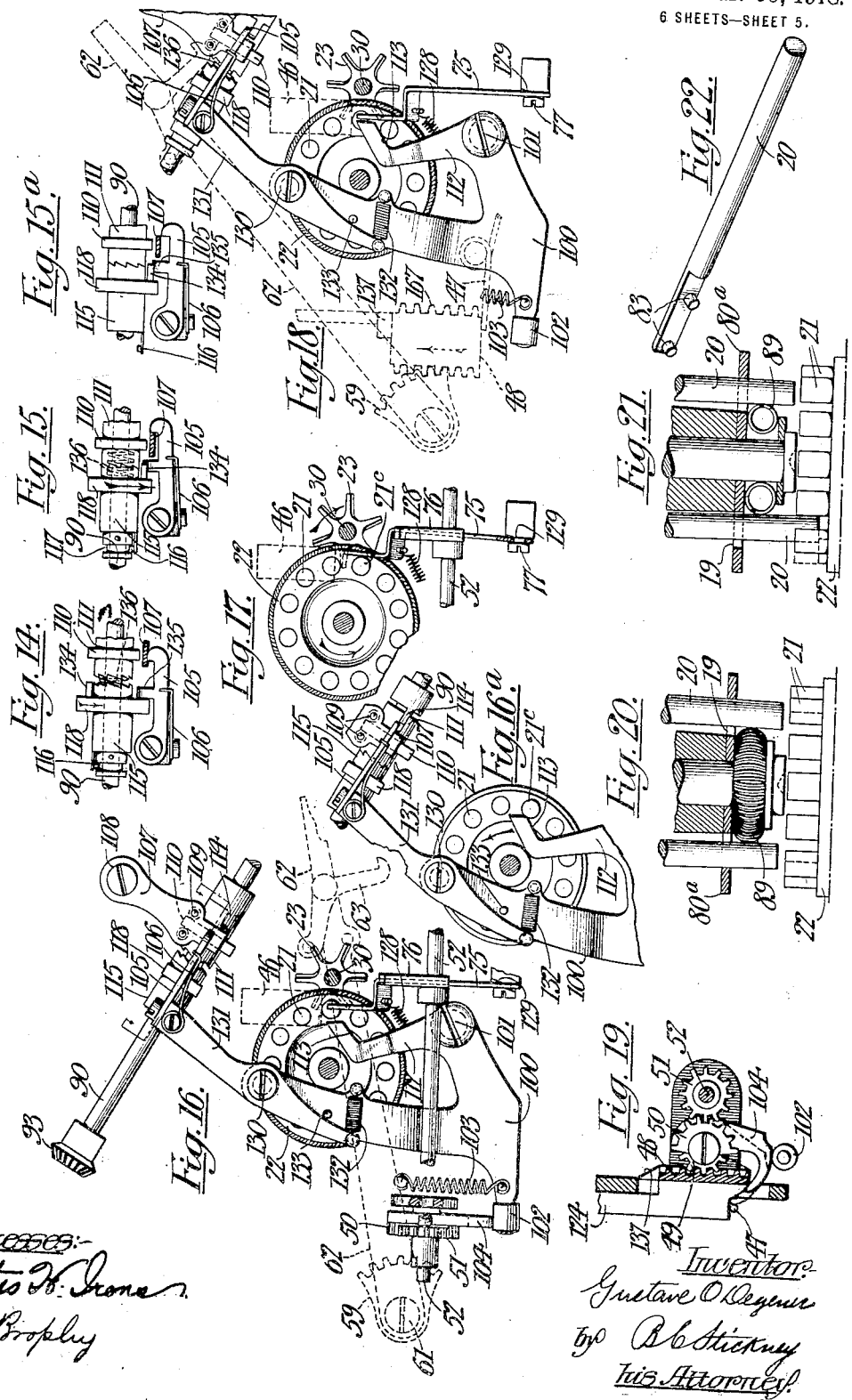

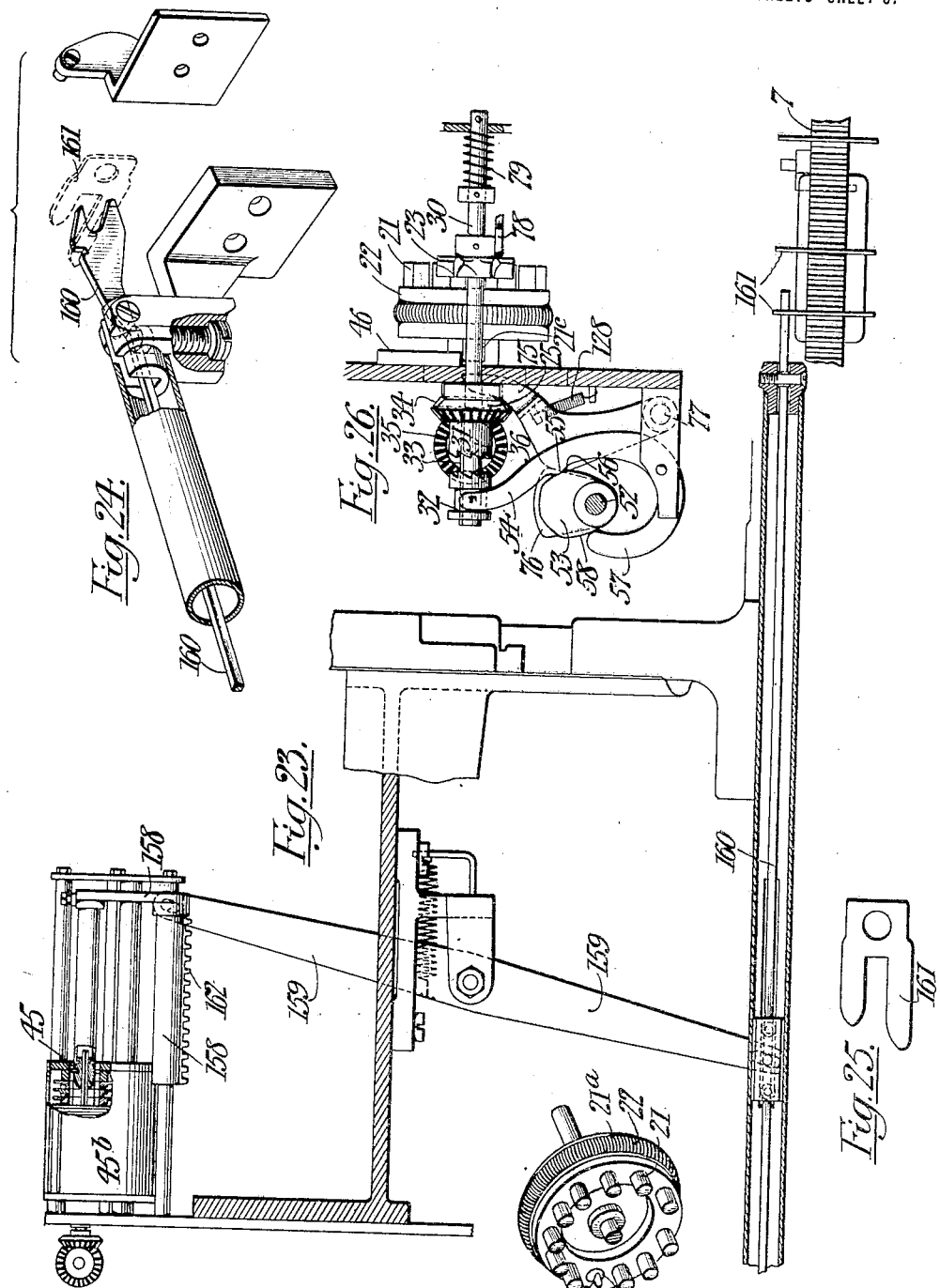

GUSTAVE O. DEGENER, OF NEW YORK, N. Y., ASSIGNOR TO UNDERWOOD COMPUTING MACHINE COMPANY, OF NEW YORK, N. Y., A CORPORATION OF NEW YORK.

COMBINED TYPE-WRITING AND COMPUTING MACHINE.

1,260,759. Specification of Letters Patent. Patented Mar. 26, 1918.

Application filed October 31, 1912. Serial No. 728,803.

*To all whom it may concern:*

Be it known that I, GUSTAVE O. DEGENER, a citizen of the United States, residing in New York city, in the county of New York and State of New York, have invented certain new and useful Improvements in Combined Type-Writing and Computing Machines, of which the following is a specification.

This invention relates to computing machines of the kind in which a single set of numeral keys controls the operation of a master wheel or member which is adapted to operate in succession upon the dial wheels, and preferably in which the numeral keys form part of a typewriting machine.

The improvements are illustrated in connection with a machine disclosed in the United States Patent No. 1,020,082, granted to me March 12, 1912, although many of the improvements may be used in other machines.

In said patent the master wheel, which works upon the dial wheels, is connected to an index wheel, which carries a set of index pins and constitutes a gear. With this gear meshes a motor-driven pinion, the index pins constituting the teeth of said gear being under the control of said numeral keys, so that any pin may be displaced so as to mutilate said gear. When the gear is mutilated at any point, the motor-driven pinion cannot turn it beyond that point. When any numeral key is depressed, the gear is restored at the previously mutilated point, and mutilated at a new point at a distance from the old point corresponding to the value of the key struck. The pinion can then turn the gear until the point is reached where the gear has been just mutilated by the last operated key; at which point the gear is arrested and the pinion revolves idly, said gear being arrested by a stop which engages one end of the last-displaced index pin.

In said patent, the rotation of the computing wheels is delayed until the type key, upon its return stroke, permits the feed of the typewriter carriage, which in turn permits the computing wheels to rotate.

One of the features of the present invention is to provide simple and effective means for causing the computing wheels to begin rotation during the down-stroke of the key, and to complete the rotation independently of the up-stroke of the numeral key. To this end, in this specific instance, the index wheel or mutilated gear is restored during the down-stroke of the key; and during the same stroke, the motor-circuit is closed and the motor-pinion rotates the index wheel, together with the master wheel and dial wheel; and the remaining movements of these parts proceed to completion independently of any further movement of the depressed numeral key; the index wheel being arrested by means of the last-displaced index pin thereon, the motor-driven pinion becoming disconnected from the index wheel, the motor-circuit being broken, and generally the parts which are common to all of the numeral keys being returned to normal positions in advance of the return of the numeral key itself to normal position. When the key is returned, it is re-connected by means of a latch or trip mechanism to the general members of the computing device.

A further object of the invention is to lighten the touch of the keys, and to that end I cause the work to be performed by the motor which heretofore has been performed by the fingers of the operator. Preferably the depression of any numeral key of the typewriter releases a master-spring, which performs various functions, as will hereinafter appear; and finally, by means of said spring, a cam is clutched to a motor-driven shaft, and caused to re-set said master-spring ready for the operation of the next key, this re-setting being done independently of the return of the key to normal position; and the aforesaid trip or latch mechanism operates to re-connect the same so that it may release the master-spring to perform the various functions referred to.

A further object of the invention is to prevent errors in computation which are liable to arise by reason of the vibrations of the typewriting carriage which occurs at the completion of every letter-feeding movement thereof, by reason of the light construction and springiness of the parts. I cause the aforesaid master-spring to call into operation two justifying dogs, which engage racks, one on the main-adding machine carriage, and one on the cross-footing carriage, (although the latter may be omitted when no cross-footing is performed). These dogs justify the computing carriages or bring them to exact positions, and also temporarily lock the same positively against displacement in either direction, so that there is no liability of the master wheels acting on any except the proper dial wheels. These dogs and the other devices which are common to all the numeral keys, are restored to normal positions by the power of the motor, in the manner already referred to.

Other features and advantages will hereinafter appear.

In the accompanying drawings,

Figure 1 is a side elevation of an Underwood typewriting and computing machine embodying the present improvements, and showing the parts in normal positions.

Fig. 2 is a detail of the mechanism for automatically justifying and locking the computing carriages against movement while the wheels are being operated.

Fig. 3 is a front perspective view of the computing mechanism seen at Fig. 1, the parts being in normal position.

Fig. 3ª is a perspective of one of the justifying dogs for the main-adding machine carriage.

Fig. 4 is a plan to show the justifying dogs and racks for the different totalizers.

Fig. 5 is a perspective view to illustrate the latch mechanism re-connecting the numeral keys to the adding mechanism before the last depressed key has been released; the latch mechanism comprising a temporary catch 125 for this purpose.

Fig. 6 is a front perspective view of the mechanism connecting the master-spring to the feeding mechanism of the typewriter carriage, to insure that said feeding mechanism shall not complete its feeding stroke until after the computing wheels have completed their rotation.

Fig. 7 is a sectional side elevation of one of the totalizers commonly used in said Underwood machine.

Fig. 7ª is a plan of certain gears commonly forming part of the tens-carrying mechanism in said Underwood machine.

Fig. 8 is a sectional elevation of the typewriting mechanism showing some of the parts seen at Fig. 6.

Fig. 9 is a sectional side elevation taken through certain key-operated jacks which are used to displace or set the index pins; showing also the arrangement of the blades by which said jacks are set, these blades also coöperating to prevent simultaneous operation of any two numeral keys.

Fig. 10 is a sectional plan of the key-operated blades and jacks and the index pin wheel, showing one of the index pins as having been set by a key.

Fig. 11 is a view similar to Fig. 10 showing a jack-setting blade as having been swung idly from the Fig. 10 position, during the completion of the down-stroke of the key.

Fig. 12 is a sectional elevation showing a guide for the ends of the jacks which set the index pins; the index pin wheel being freely rotatable notwithstanding the fact that a jack is in position, since the latter is yieldingly mounted, and may be forced aside by the remaining index pins as the wheel rotates.

Fig. 13 is a sectional plan of the computing mechanism.

Fig. 14 is a plan of a normally open clutch between the motor-driven counter-shaft 90 and a cam 118 which restores the master-spring referred to; the parts being in normal positions.

Fig. 15 shows the clutch closed and the cam as having been rotated and the clutch as about to re-open.

Fig. 15ª illustrates the method by which the clutch is caused to open.

Fig. 16 is an elevation to show the clutch mechanism of Fig. 14 and its connection with the index pin wheel, which controls the closing of such clutch; the parts being in normal positions.

Fig. 16ª is a view like Fig. 16, but showing the index pin wheel as having closed said clutch.

Fig. 17 illustrates the manner in which the last-projected index pin may crowd aside the hammer or arm, which subsequently restores such index pin to normal position at the down-stroke of the numeral key.

Fig. 18 shows the master-spring as having been released, and the index wheel as having been rotated and about to close the clutch to the Fig. 15 position, just before the index wheel comes to a stop.

Fig. 19 is a sectional front elevation of certain gears and cams which are operated by the master-spring.

Fig. 20 is a plan showing an annular helical spring holding the jacks normally in their outer positions at Fig. 12.

Fig. 21 illustrates the manner in which the revolving index pins crowd aside a yielding jack 20 when it is held in working position by a depressed numeral key.

Fig. 22 is a perspective view of one of the jacks.

Fig. 23 is a sectional plan to illustrate the connection between the cross-adder and the typewriter carriage.

Fig. 24 is a perspective view of the hook which intermittently connects the cross-adder to the typewriter carriage.

Fig. 25 is a side elevation of one of the adjustable lugs on the typewriter carriage for connecting with the hook seen at Fig. 24.

Fig. 26 is a sectional rear elevation showing the index pin wheel or mutilated gear, the motor-pinion for driving the same, the clutch mechanism for connecting the pinion to the motor, and a device to restore the previously projecting index pin.

Fig. 27 is a fragmentary perspective view showing the relation of the mutilated pin wheel or gear and its driving pinion.

Letter-type keys 1 and numeral type keys 2 are mounted on levers 3, which, by means of sub-levers 4, are connected to type bars 5, to swing them upwardly and rearwardly against a platen 6. This platen is mounted on a carriage 7, propelled by a spring barrel 8, and having a rack 9 meshing with a pinion 10, to which is connected an escapement wheel 11. This wheel is controlled through the usual alphabetical and other type keys, including the keys 1, 2, to cause the carriage to feed at every type stroke. For this purpose, dogs 12, 13, engage the wheel 11, and these dogs are rocked or controlled by means of a universal bar frame 14, which is pressed rearwardly by heels 15 on the type bars.

The numeral keys are connected by links 16 to a set of bell cranks 17, and the latter, through links 18, rock levers 19, which operate jacks 20 grouped in a circle. Any jack may push out any of a circular series of pins 21, which are carried by a drive wheel 22 connected to the computing wheels and capable of turning any thereof, having a function similar to that of an index pin wheel in a gear cutter. The pins are detained in either normal or projected positions by a coil-spring band 21$^a$, engaging seats or grooves 21$^b$ in the pins, Fig. 10. These pins 21 perform the function of gear teeth. Meshing therewith is a driving pinion 23, which may be connected to a motor 24 by means of bevel gears 25, 26, shaft 27, and bevel gears 28, 29. The driving pinion 23 may be fixed to a shaft 30 on which it turns, this shaft being, however, displaceable endwise for a purpose presently to be explained.

The gear 25 is loose on the shaft 30, and is fast to one member 31 of a clutch which is normally open, the other member 32 of said clutch being splined to said shaft 30 at 33. When the clutch is closed, power is communicated from the motor shaft 27 through the driving pinion 23 to the gear comprising wheel 22 and its pins 21, to rotate the same, for the purpose of effecting a computation; there being provided upon the shaft of said wheel 22 a bevel pinion 34, Fig. 1, to mesh with a bevel pinion 35 on shaft 36, which is connected by bevel pinions 37 and 38 to a vertical drive-shaft 39, which has suitable connections to bevel pinions 40 and 41 upon shafts 42 and 43, which carry respectively internal master wheels 44 and 45 in upper and lower computing heads 45$^a$, 45$^b$. It will thus be seen that the effect of the driving pinion 23 is to rotate, through the described gearing, one or more master wheels 44, 45, turning the pinions 44$^a$ and dial wheels 44$^b$ (Fig. 7) in their respective computing heads or totalizers, the master wheels and dial wheels having a relative step-by-step movement to correspond with the step-by-step movement of the typewriter carriage.

As set forth in United States Patent No. 1,020,082, granted to me March 12, 1912, the wheel 22 is arrested by the engagement of the end 21$^c$ of the last-projected pin 21 with a counter-stop 46, fixed on the framework. The distance through which the wheel 22 is rotated is equal to the distance between the last-projected pin 21 and said counter-stop 46. The jacks 20 are placed in such positions that the depression of any numeral key 2 will cause the projection of an index pin 21 at such distance from the counter-stop 46 as to cause the subsequent rotation of wheel 22 to be equal to the number of steps indicated by the depressed key 2; so that the master wheel 44 or 45 or both may be rotated a corresponding distance. Rebound of the index wheel when a pin strikes the stop is prevented by a pawl 46$^a$, Figs. 1 and 13, which engages the unset pins 21.

The clutch 31, 32, between the motor and the computation wheel (or index pin wheel) 22 is normally open, but a spring 47 (seen at the lower part of Figs. 1 and 6) tends normally to close said clutch; said spring pressing up against a vertically sliding rack member 48, which, by means of mutilated pinion 49, Fig. 19, and mutilated gear 50, turns a pinion 51 which is fixed on a horizontal rock shaft 52; the latter carrying a cam 53, Figs. 1, 3 and 26, to rock an arm 54, to shift said clutch member 32 to close the clutch. The arm 54 has a projection 55 engageable by a cam-edge 56 upon said cam-plate 53 to swing said arm 54 to close the clutch, whenever the normally restrained spring 47 is permitted to lift the rack 48. It will be noticed that the arm 54 is also provided with an extension 57 to engage with a cam surface 58 on the plate 53, for retracting the arm and thereby opening the clutch at the return movement of said rock shaft 52 to normal position.

Said spring 47 is normally restrained from closing the computation wheel clutch 31, 32, by means of a device which comprises a segment 59, meshing with rack-teeth 60 on said rack or slide 48, and fixed upon a horizontal rock shaft 61, which also has fixed thereon a long arm 62, upon the free end of which is pivoted a latch 63, normally caught under a catch 64, the latter being movable to release said latch, and being for this purpose placed under the control of the numeral keys. It will be noticed that each of the key connections 18 carries a head 65, and these heads, being grouped in a circle, may each engage a universal disk or plate 66 and move the same; this disk being supported on a sliding rod 67, and having a returning spring 68. Fixed to the disk is also a head 69, in engagement with which is one end of a lever 70, which is pivoted at 71. The other end of the lever is connected by a link 72 to said catch 64, which is pivoted at 65 upon the framework. The movement of said catch which is effected by any numeral key 2, is toward the right at Fig. 3, and by this means the latch 63 is released, and the arm 62 is permitted to fly up under the tension of the spring 47; the shaft 52 being rocked and the clutch 31, 32, closed, whereby the motor is permitted to rotate the pinion 23 and the index wheel or computation wheel 22, with its train of connecting mechanism to the master wheel or wheels of the computation heads, seen at Figs. 1 and 2. The latch-arm 62 plays in a fixed guide 74.

The pinion 23 is so placed that when the last-displaced index pin 21ᶜ engages the counter-stop 46, as seen at Fig. 26, said pinion rotates idly in the space which is left vacant by such displacement of said index pin, until the motion of the pinion dies out, or until said last-displaced index pin 21 or 21ᶜ is returned to normal position, which return will be necessary in order to enable the pinion 23 to act again upon the wheel 22.

For this purpose an arm 75 is caused to strike the end 21ᶜ of the displaced index pin at the actuation of a numeral key to return said index pin to normal position, and cause it to enter a space between adjacent teeth of pinion 23. This arm 75 is operated by said rock shaft 52 concomitantly with the operation of the clutch-closing arm 54; said shaft 52 having a cam 76 to engage said arm 75 and turn it on its pivot 77.

In case the returning index pin 21 collides with a tooth of said pinion 23, the latter will yield, the shaft 30 for this purpose being movable longitudinally, and a deflecting spur or tooth 78 will be engaged by a tooth of pinion 23, whereby the latter may be turned to properly mesh with the returned index pin 21; the shaft 30 and pinion being then returned endwise to normal positions by a spring 79 coiled around the shaft.

From the foregoing it will be seen that when a numeral key 2 is depressed, its link 16 turns its bell crank 17 and pulls its link 18 to the left, whereby that lever 19 which is connected to said link is caused to project one of the jacks 20, the latter in turn displacing an index pin 21. At the same time the universal plate or member 66 vibrates the lever 70, and through the link 72 rocks the catch 64 to release the latch 63, so that the normally restrained spring 47 may turn the rock shaft 52 (through the intermediary of the rack member 48, pinion 49, gear 50 and pinion 51), and so that the cam member 53 may rock arm 54 to close the clutch 31, 32 between the motor and the pinion 23, whereby the latter is driven, while the cam 76 upon said shaft 52 causes the arm 75 to knock the index pin 21ᶜ back to normal position, whereby the pinion 23 is re-connected to the index wheel 22, and rotates the same until the latter is arrested by engagement of counter-stop 46 with the index pin which has just been displaced at the new point of mutilation. This movement of the index wheel is communicated by the described gearing to the master wheels in the computing heads. The motor may be constantly revolving; but preferably the motor-circuit is normally broken, and is closed at the operation of any key 2 in a manner presently to be explained.

The jacks 20, which set the index pins 21, are in the form of rods grouped in a circle and mounted for endwise movements in guide frames 80, 80ᵃ. The key-actuated levers 19 comprise arms 81, on the free ends of which are formed blades 82, which are radially arranged, Fig. 9, and are intended not only to interfere with one another, as set forth in United States Patent No. 1,010,349, granted to me November 28, 1911, to prevent simultaneous operation of two numeral keys, but also to thrust forward the jacks 20 to set the index pins 21. For this purpose the blades work between pins 83, of which each jack is provided with two. Normally the blades stand in the position shown at Fig. 13, but during the depression of any numeral key, the corresponding blade swings into the position at Fig. 10, and thrusts its jack forward, to set the index pin 21, as illustrated.

The blade has between its ends a cam portion 84, which operates the jack. Between said cam portion and the free end of the blade there is a dwell portion 85, which, during the first part of the depression of the numeral key, holds the jack against operation, so that any index pin 21 will not be set by a mere accidental or false touch upon the key, which may not be sufficient to cause the type bar to print. At the proper point in the down-stroke of the key, the thrust of the jack and the setting of the index pin is quickly accomplished, and thereafter the jack is held against endwise motion by the dwell portion 86, near the hilt of the blade 82. When the key returns to normal position, these parts are returned by the usual key lever spring 87, Fig. 8, assisted by the spring 68 which is provided for the universal member 66.

It has already been seen that the release of the latch 63 occurs during the down stroke of the numeral key 2, and hence that the train of computing wheels is started into action during such down-stroke of the key, and independently and in advance of the return of the key to normal position. It will now be described how the index wheel 22 may be freely rotated during the final part of the down-stroke of the key 2, and while the jack 20 remains projected into the path of the revolving circle of unset index pins 21.

As seen at Fig. 10, the operated jack 20 has reached a position, at the conclusion of its stroke, very eccentric to the index pin 21, and the consequence is that when the wheel 22 rotates, the index pins may each engage the periphery of the jack (which may be of cylindrical form) and cam or force the same to one side, that is, inwardly toward the center of rotation of the wheel 22; the frame 80ª having radial guiding-slots 88 for the free ends of the jacks, thus permitting the camming of the projected jack to one side, as illustrated in one instance at Fig. 12. Hence the index wheel 22 and the master wheel or wheels connected thereto may be rotated, and their movements may be completed independently of the return of the key to normal position, and in fact in some instances before the key 2 really completes its down-stroke.

A coiled spring 89, arranged in the form of an annulus, is compressed within the circle of jacks 20 at their free ends, and by tending to spread, holds all of the jacks lightly in their outermost positions. This spring will yield to permit the shouldering aside of the projected jack by the successive unset index pins. Upon the release of the key, the spring 89 will snap the free end of the jack out to the end of its slot 88 in its frame 80ª, this being the normal position of the jack.

It will be remembered that the power of the spring 47 is used to close the clutch between the motor and the index wheel 22, and also to restore the index pin 21ᶜ that had been previously set. This spring is itself re-tensioned by power derived from said motor 24. The power for retensioning the spring, and returning the parts that have been operated thereby, is derived from a counter-shaft 90, which is connected by a bevel pinion 91 to a bevel pinion 92 on the motor shaft 27. It will be noticed, parenthetically, that this shaft 90 is used for operating the usual auxiliary tens-carrying mechanism of the Underwood combined typewriting and computing machine; being for this purpose connected by a pinion 93 to a pinion 94 on vertical shaft 95, which is connected by reversible clutch mechanism to upper and lower pinions 96 and 97 on tens-carrying drive shafts 98, 99.

On said counter-shaft 90 is a normally open clutch which at the proper moment, is closed, to enable the counter-shaft 90 to re-tension the spring 47 and restore its associated mechanism to normal position. The closer or controller for this clutch is in the form of a T-shaped arm 100, pivoted at 101 on the framework, and having a roll 102, which, by means of a spring 103, is caused to bear constantly up against a cam 104, Figs. 3, 16 and 19, whereby said clutch-closer 100 is normally held in the Fig. 1 position against the tension of said spring 103. This cam 104 is rigidly attached to mutilated gear 50; and when the latter is turned (by spring 47) in the manner already described, the spring 103 is permitted to raise the roll 102, owing to the shape of the cam; and the upstanding arm 100, which carries a latch 105, is swung over to the position at Fig. 18, when it is snapped by means of a spring 106 over the edge of a clutch-closing arm 107, the latter pivoted at 108 on the framework, and having two projections 109 to engage a collar 110 on the movable member 111 of the clutch on said counter-shaft 90. The latch 105 is now in position for swinging the arm 107 to engage the movable member of the clutch to close the same.

The closing of this clutch is finally effected by means of the last-projected index pin 21 or 21ᶜ, just before the latter is arrested by the counter-stop 46. An arm 112, rigid with the clutch-closer 100, is provided with a cam-edge 113, which normally, as at Fig. 16, is clear of the projected index pin, but which, when said clutch-closer 100 is swung from its normal position at Fig. 16 to the position at Fig. 18, is also swung so as to lie diagonally in the path of the advancing index pin 21ᶜ which was last projected, so that the same may engage said cam, and, by reason of the continued rotation of the wheel 22, may force the clutch-closer 100 back to normal position, whereby the latch 105 on said clutch-closer is caused to close the clutch, as at Fig. 16ª.

The movable clutch member 111 is splined at 114 to the counter-shaft 90, and the coöperating clutch member 115 is loose on said shaft, having a pin 116 to engage a peripheral groove 117 on the shaft, to prevent endwise displacement of the clutch member 115. Upon the latter is a cam 118, which is normally stationary, but which now makes a revolution, and, by engaging a roll 119, rocks an arm 120 pivoted upon a stud 121 fixed on the framework, and having a returning spring 120ª. Said arm 120 forms a portion of a bell crank, the other arm 122 thereof striking down a shoulder or tappet 123 formed upon an upstanding rod 124, which at its lower end is rigid with the rack member 48, whereby the latter is depressed to normal position, thus restoring the parts 50, 51, 42, 76, 53, 54, 32, 75, as well as the latch arm 62. The latch 63 now catches either upon the catch 64 or (if the numeral key 2 be still depressed) upon an auxiliary catch 125 provided upon the catch 64 at one side thereof, as at Fig. 5; a spring 126 causing the latch 63 (which is pivoted at 127 upon the arm 62) to snap under either catch 64 or 125. It will of course be understood that upon the subsequent relief of the key 2 from pressure, the latch 64 will swing back from the Fig. 5 position to the Fig. 3 position (under the influence of spring 68) so that the latch 63 will slip off from the catch 125 onto the catch 64, as shown in normal position in Fig. 3.

A spring 128 returns the pin-restoring arm 75 to normal position as the cam 76 is retracted. This spring is offset or diagonally arranged, as it is also used for rocking the arm 75 facewise after the latter has been pressed aside by the advancing projected pin 21$^c$ at the time that the latter is camming over the arm 112. The arm 75 is fitted loosely on its pivot, as at 129, to permit it to be displaced or pressed aside from the position at Fig. 18 to the position at Fig. 17, when the last-projected pin 21$^c$ is approaching the counter-stop 46, as aforesaid.

The cam 104, when being returned to normal position by the rack 48, rocks the clutch-controlling arm 100 slightly away from the projected index pin 21$^c$, leaving the latter free to be subsequently thrust into normal position by the arm 75. To permit the arm 112 to be swung away from the index pin, as at Fig. 16, after the clutch 111, 115, is closed, the arm 100 is made in two parts pivoted together at 130, the upper part 131 carrying the clutch-closing pawl or latch 105, and the two parts being held together by a spring 132, with the pivoted part resting against a stop 133 on the main arm.

As soon as the bell crank 120, 121, has thrust down the shoulder 123 and the restoring rod 124, the power-driven countershaft 90 becomes disconnected from the restoring mechanism. For this purpose a tappet 134 on the cam 118 engages a lip 135 on pawl 105, which lip has a beveled tip as indicated at Figs. 14, 15, and 15$^a$, so that the tappet 134 may cam the pawl or latch away or free from the arm 107, as at Fig. 15$^a$, thereby releasing the arm and permitting a spring 136 to restore the movable clutch member 111 to normal open position; 136 being a compression spring coiled around the counter-shaft 90 and working between the normally stationary clutch member 115 and the movable clutch member 111. The face of the arm 107 may be so broad that the tip of the latch 105 may continue to rest thereon when the parts are in normal positions, Fig. 14.

The electric circuit through the motor 24 is normally open, and a circuit-closer is provided for action when a numeral key is depressed. The circuit-closer is preferably operated by the general drive spring 47. For this purpose a cam 137 is provided upon the rack member 48 that is driven by said spring, and engages a roll 138 carried by an arm or bell crank 139 which is pivoted at 140. One end of a horizontal link 141 is connected to said arm 139; the other end being supported on an idle arm 142, Fig. 3. Upon this link 141 is provided a shoulder 143, to engage a yielding terminal or switch member 144 and spring it against a companion terminal 145, whereby the motor circuit 146, 147 is closed. As far as described, when the rack member 48 subsequently drops, the terminal or switch arm 144 would swing back to normal position, thus breaking the circuit and also restoring the link 141 and arm 139 to normal positions. It is not however desired to break the circuit and thus stop the motor until after the cam 118 has completed its function and returned to normal position. The work of the cam 137, Figs. 1 and 3, in holding the circuit closed as it moves away from the arm or bell crank 139 is taken up by the bell crank 120, 122, as it rocks in carrying the rack 48 and the cam 137 downward to their normal position, through the intermediary of a link 148 which is connected to the bell crank 139 and the bell crank 120, 122. The link 148 has an idle motion, as by having a pin-and-slot connection with the bell crank 120, 122, so that the circuit can be closed at the initial depression of a numeral key, through the action of the cam 137, without disturbing the bell crank 120, 122. After the cam 118 has completed a rotation and disconnected the pawl or latch 105, the spring 120$^a$ will return the bell crank 120, 122, breaking the circuit, and thus stopping the motor.

It will be seen that the depression of a numeral key 2 not only projects the corresponding index pin, but also causes other described operations to be performed, and among others the closing and opening of the motor-circuit independently of the release of the key.

The totalizer 45$^a$ is mounted upon a carriage 150, which is connected to the typewriter carriage 7 by a bracket 151, Fig. 1; the master wheel 45 being stationary while the carriage travels. To prevent the travel or any displacement of this carriage while the computing wheels are turning, there is provided a dog 152, to engage any of the notches in a rack 153 mounted upon the totalizer 45$^a$. This dog is mounted upon a rock shaft 154, which at one end is provided with a segment 155 to mesh with a rack 156 on an extension 157 of the upstanding rod 124. The first movement of said rod 124 is upward, thereby rocking the dog 152 forwardly into mesh with the rack 153, as in Fig. 3$^a$, and holding the totalizer 45$^a$ securely against endwise movement. When the rod 124 is subsequently driven down by the restoring arm 122, the dog 152 is rocked out of mesh, thus leaving the totalizer free to travel one letter-space with the paper carriage 7. The dog is beveled as at 152ª, Fig. 2, to act as a justifier to bring the carriage to true position before locking the same.

The cross-totalizer 45ᵇ is stationary during the letter-feeding movements of the carriage, but the master wheel 45 thereof is adapted to have a step-by-step movement, being for this purpose connected to a carriage 158, and the latter being connected by a cross-lever 159 to a hook 160, Fig. 23, adapted to engage and disengage in succession certain column-stops 161 on the typewriter carriage, Fig. 23, to perform cross addition. Upon the master wheel carriage 158 is provided a rack 162, and a beveled dog 163 is mounted upon a rock shaft 164, the latter having a segment 165 to mesh with a rack 166 on the extension 157, Fig. 2, so that the dog 163 is rocked into mesh with the rack 162 simultaneously with the movement of the dog 152 into mesh with the rack 153 on the totalizer 45ª, so that the master wheel 44 is first brought to true position and then prevented from displacement during its rotation; the dog 163 thereafter releasing the rack 162 simultaneously with the release of the rack 153.

A connection is also preferably made to the typewriter carriage or to the feeding mechanism thereof, to control the same so as to insure the completion of the rotation of the index wheel 22 before the typewriter carriage starts to feed. For this purpose a second rack 167, Figs. 6 and 18, is formed on the rack member 48, which is driven by said general driving spring 47, and a segment or lever 168 connects the same to a pinion 169 fixed on a rock shaft 170, which has an arm 171 provided with a pin-and-slot connection at 172 to an arm 173, the latter fixed upon rock shaft 174, which carries an upstanding arm 175 having a roll 176 to engage a cam 177 on an arm 178 fixed upon the rigid dog 12 of the carriage-escapement mechanism, whereby when said rack member 48 is lifted by the spring 47 as aforesaid, the rigid or non-feeding carriage dog 12 is moved rearwardly into engagement with escapement wheel 11; this movement being independent of the typewriter universal bar 14, although one movement may accompany the other. The dog 12 is held in this position, and the typewriter carriage 7 is therefore prevented from advancing, until the return of the rack member 48 to normal position, which, of course, occurs after the restoring members 120, 122, have been operated by the power-driven cam 118 upon the completion of the rotation of the index wheel 22. In the rapid operation of the keys, this release of the rigid dog 12 may not occur until the numeral type bar has returned a substantial distance to normal position, and hence not until after the universal bar 14 has been returned fully to its normal position by the usual spring (not shown).

It is to be noted at this point that if any of the locks for holding the traveling elements of the computing mechanism or the traveling typewriter carriage against movement during a computing action, should not be able to operate, as, for example, when the master wheels were not in register with the computing wheels which they were to drive, but between two of said wheels, then, of course, through the connected linkages, the rack bar 48 would be prevented from moving upward under the impulse of the auxiliary power spring 47, thus preventing the initiation of a computing action. This, then, forms a safety device preventing the rotation of the master wheels by the motor at times, so that an incorrect computing action or disrupting action would not take place.

As is usual in said Underwood machine, the shaft 98 carries a pinion 179, meshing with a pinion 180, which is connected to a pinion-barrel 181, which may turn idly, but is adapted to engage teeth 182 on a tens-carrying member 183, which is started by a tens-carrying tooth 184, of which one is as usual connected to each computing wheel 44ª.

Variations may be resorted to within the scope of the invention, and portions of the improvements may be used without others.

Having thus described my invention, I claim:

1. In a computing machine, the combination with computing mechanism, of actuating mechanism therefor normally disconnected therefrom, a series of numeral keys, power mechanism for connecting said computing mechanism and said actuating mechanism under control of said numeral keys, and automatic means brought into action at the completion of a computation for restoring power in said power mechanism.

2. The combination with computing mechanism, of actuating mechanism therefor normally disconnected therefrom, numeral keys, power mechanism for connecting said actuating mechanism with said computing mechanism under control of said numeral keys, said actuating mechanism acting to carry out the computation as determined by the selected keys, leaving said keys free to return to their normal position while said power mechanism finishes the work assumed, and automatic means dependent for its action on said computing mechanism completing a computation for restoring power in said power mechanism.

3. In a computing machine, the combination with computing mechanism, of a source of power for driving said computing mechanism, a clutch for controlling the effectiveness of said source of power to drive said computing mechanism, shifting means for said clutch, a cam for actuating said shifting means, a shaft for said cam, a gearing on said shaft, a rack, gearing connecting said rack with said first-mentioned gearing, a spring for operating said rack, restraining means for preventing the actuation of said rack by said spring, numeral keys for controlling the action of said computing mechanism, and connections enabling said numeral keys to control said restraining means.

4. In a computing machine, the combination with computing mechanism, of a computation wheel for determining the extent of movement of said computing mechanism, said wheel having a series of pins constituting a mutilatable gear, numeral keys for setting any of said pins to thereby mutilate said gear, the set pin serving as a stop, which pin must be reset to again complete said gear to start a computation, and power-means controlled by said keys for resetting the previously set pin to thereby start a computation.

5. In a computing machine, the combination with a rotary indexing wheel having a series of pins settable to determine the extent of rotation thereof, the stopping point of said wheel being determined by the position of a set pin thereon, of restoring means for unsetting a set pin; yieldingly held in juxtaposition to said wheel so as to be pushed out of the path of rotation of any set pin.

6. The combination with a plurality of computing heads having separate traveling carriages, of numeral keys for determining the computation carried on by said computing heads, locking means individual to the separate carriages for holding them against traveling during the running up of a computation started by said numeral keys, and actuating means common to said individual locking means brought in play at the actuation of each numeral key to manipulate all of said locking means simultaneously.

7. The combination with a computing head, of a series of controlling numeral keys, locking means for holding said computing head in register during the running up of a number, means for releasing said locking means, and timing means for delaying the release of said locking means, even after numeral key has returned, until after the number has been completely run up on said computing head.

8. The combination with a computing head having a traveling element, of a rack on said traveling element, a dog arranged to engage between the teeth of said rack, a shaft for swinging said dog, a segment mounted on said shaft, and a rack engaging said segment to rock said dog into and out of engagement with said rack on said traveling element.

9. The combination with a computing head having a traveling element, of a rack on said traveling element, a dog arranged to engage between the teeth of said rack, a shaft for swinging said dog, a segment mounted on said shaft, a rack engaging said segment to rock said dog into and out of engagement with said rack on said traveling element, a spring for actuating said last-mentioned rack, and numeral keys for controlling the running up of numbers on said computing head and also controlling the action of said spring.

10. The combination with a computing head having a traveling element, of a dog for locking said traveling element against movement, a reciprocating member for manipulating said dog, a spring for actuating said reciprocating member, locking means restraining the actuation of said reciprocating member by said spring, and numeral keys for controlling the running up of numbers on said computing head and also acting to release said locking means.

11. The combination with a plurality of computing heads each having a traveling element, of a dog for locking each of said traveling elements against movement, a rock shaft for each of said dogs, a segment for each of said rock shafts, a rack member common to all of said segments, a spring for actuating said rack member, locking means for restraining the action of said spring, and numeral keys for controlling the running up of numbers on said computing heads and also acting to control the release of said locking means.

12. In a computing machine, the combination with a typewriter carriage, of computing elements including a computing head and a master means therefor, said master means and said computing head having relative traveling movement and said computing elements being remote from said typewriter carriage, a connection from said typewriter carriage to one of said computing elements for controlling said relative movement, locking means effective on one of said computing elements for preventing traveling movement between said computing head and its master means, a lock at the typewriter carriage for preventing movement thereof and means for rendering effective both of said locks and maintaining them effective during a computing action.

13. In a computing machine the combination with a typewriter carriage and escapement mechanism therefor, computing elements including a computing head and a master means therefor said master means and said computing head having relative traveling movement, said computing elements being situated remote from said typewriter carriage, a connection from said carriage to one of said computing elements for controlling said relative traveling movement, locking means effective on one of said computing elements for preventing traveling movement between said computing head and its master means and means for rendering said lock effective during computation and concomitantly locking said typewriter carriage through said escapement mechanism.

14. The combination with a wheel having a series of pins adjustably mounted thereon so as to be set from one position to another, means for rotating said wheel, and a series of jacks for setting said pins, said jacks being loosely mounted so as to permit them to be cammed out of the path of said pins while in their actuated position during the rotation of said wheel.

15. The combination with a rotatable wheel having a series of pins mounted so as to be set from one position to another, of a series of jacks for setting said pins, and a guide plate having a series of radial slots in which said jacks may play so as to permit said pins to force said jacks out of their path during the rotation of said wheel.

16. The combination with a rotatable wheel having a series of pins settable from one position to another, of a series of jacks converging in the general direction of the axis of said wheel and acting to set said pins, said jacks being yieldingly mounted so as to be capable of moving toward the axis of said wheel out of the path of said pins.

17. The combination with a rotatable wheel having a series of pins settable from one position to another, of a series of jacks for setting said pins, and spring means for yieldingly determining the position of said jacks with respect to the path of rotation of said pins.

18. The combination with a rotatable wheel having a series of pins settable from one position to another and arranged in the arc of a circle, of a series of jacks for setting said pins, said jacks having their ends arranged in the arc of a circle in apposition to the ends of certain of said pins, and an annular spring for determining the radial position of the ends of said jacks with respect to said pins.

19. The combination with a rotatable wheel having a series of pins settable from one position to another and arranged in the arc of a circle, of a series of jacks for setting said pins, said jacks having their ends arranged in the arc of a circle in apposition to the ends of certain of said pins, and an annular spring located within the space inclosed by said jacks and yieldingly holding said jacks with their ends in apposition to said pins.

20. The combination with a series of pins settable from one position to another, of a series of jacks for setting said pins, and a blade for actuating each of said jacks. said blades having a cam portion to perform the actual work of shifting the said jacks and also having a dwell portion to permit a further movement of said blades while said jacks remain in their actuated position.

21. The combination with a series of settable pins, of a series of jacks for setting said pins, and a series of blades for actuating said jacks, said blades having a cam portion to perform the actual work of shifting said jacks and also having dwell portions located on opposite sides of the cam portion to enable a relative inactive movement between said jacks and said blades.

22. The combination with a series of pins settable from one position to another, of a series of jacks for setting said pins, said jacks having a pair of spaced pins thereon, and blades engaging between said spaced pins to cam said jacks from one position to another.

23. The combination with a series of settable pins, of a series of jacks for setting said pins, and a series of blades for shifting said jacks by camming them from one position to another, said blades all passing through a common point so that no two can be actuated at the same time.

24. The combination with a series of annularly disposed settable pins, of a series of jacks converging toward a common point and capable of setting said pins, a guide plate having a series of radially extending slots for loosely supporting said jacks, an annular spring located so as to yieldingly resist a radial movement of said jacks, and cam blades engaging said jacks to shift the same to set said pins.

25. In a computing machine, the combination with computing mechanism, of a master member therefor, relatively movable with respect thereto, said master member including a train of connections including a driving part and a driven part, said connections being normally broken, numeral keys, power means, under control of said keys at each stroke thereof, for effecting a connection between said driving and driven parts, whereby said computing mechanism is driven, and means also under control of said power means, preventing relative movement of said computing mechanism and master member during a computation.

26. In a combined typewriting and computing machine, the combination with computing mechanism and a master member therefor, and movable relatively thereto, of a typewriter carriage for controlling said relative movement, a dog for determining the travel of said carriage, a source of power for driving said master member, normally broken connections between said source of power and said master member, numeral keys for determining the amount of movement of said master member, and power means, under control of said keys at each stroke thereof, for rendering said connections effective between said source of power and said master member, said power means also controlling said dog for preventing movement of said typewriter carriage during computation.

27. In a computing machine, the combination with computing mechanism and indexing mechanism therefor, including a computation wheel having settable pins to determine the amount of rotation of said wheel, and thereby of said computing mechanism, of locking means for said computing mechanism, and means brought into action by any of said pins on reaching a position determining the end of a computation for releasing said locking means.

28. In a computing machine, the combination with computing mechanism, of actuating means for said computing mechanism normally disconnected therefrom, numeral keys, indexing mechanism for said computing mechanism controlled by said keys, said indexing mechanism including a computation wheel having pins settable to determine the amount of rotation of said wheel, and thereby of said computing mechanism, means for connecting said actuating means with said computing mechanism on the downstrokes of said numeral keys, and for setting one of said pins, and means brought into action by the set pin at the conclusion of a computation, for rendering said actuating means ineffective, irrespective of the position of said keys.

29. The combination with a computing mechanism, of locking means for said computing mechanism, releasing means for said locking means, a source of power for actuating said releasing means, and a clutch for connecting said source of power to said releasing means.

30. In a computing machine, the combination with computing mechanism, of a primary motor for actuating said computing mechanism, normally ineffective on said computing mechanism, an auxiliary motor for making said primary motor effective, said auxiliary motor being normally restrained from action, numeral keys controlling the release of said auxiliary motor on each stroke of said keys, means for restoring power in said auxiliary motor from said primary motor, said restoring means including a clutch between said primary motor and said auxiliary motor, said clutch normally open, a clutch-closing member, means for positioning said member to move said clutch on the release of said auxiliary motor, means for moving said member, and thereby said clutch at the completion of a computation, and means for opening said clutch at the restoration of power in said auxiliary motor.

31. In a computing machine, the combination with computing mechanism, of a primary motor for actuating said computing mechanism normally ineffective on said computing mechanism, an auxiliary motor for making said primary motor effective, said auxiliary motor being normally restrained from action, numeral keys controlling the release of said auxiliary motor on each stroke of said keys, means for restoring power in said auxiliary motor from said primary motor, said restoring means including a connection between said primary motor and said auxiliary motor, said connection normally broken, means for making said connection dependent on release of the auxiliary motor and the completion of a computation, and a cam for breaking said connection on the completion of restoration of power in said auxiliary motor.

32. In a computing machine, the combination with computing mechanism, of a primary motor for actuating said computing mechanism normally ineffective on said computing mechanism, an auxiliary motor for making said primary motor effective, said auxiliary motor being normally restrained from action, numeral keys controlling the release of said auxiliary motor on each stroke of said keys, means for restoring power in said auxiliary motor from said primary motor, said restoring means including a connection between said primary motor and said auxiliary motor, said connection normally broken, means for making said connection dependent on the release of said auxiliary motor at the completion of a computation, and a cam operated by said primary motor for breaking said connection at the completion of the restoration of power in said auxiliary motor.

33. In a computing machine, the combination with computing mechanism, of a primary motor for actuating said computing mechanism normally ineffective on said computing mechanism, an auxiliary motor for making said primary motor effective, said auxiliary motor being normally restrained from action, numeral keys controlling the release of said auxiliary motor on each stroke of said keys, and means for restoring power in said auxiliary motor from said primary motor on the completion of each computation started by a numeral key.

34. In a computing machine, the combination with computing mechanism, of a primary motor for actuating said computing mechanism normally ineffective on said computing mechanism, an auxiliary motor for making said primary motor effective, said auxiliary motor being normally restrained from action, numeral keys controlling the release of said auxiliary motor on each stroke of said keys, means for restoring power in said auxiliary motor from said primary motor, said restoring means including a connection between said primary motor and said auxiliary motor, said connection being normally broken, and means for controlling said connection on completion of a computation.

35. In a computing machine, the combination with computing mechanism, of a primary motor for actuating said computing mechanism normally ineffective on said computing mechanism, an auxiliary motor for making said primary motor effective, said auxiliary motor being normally restrained from action, numeral keys controlling the release of said auxiliary motor on each stroke of said keys, means for restoring power in said auxiliary motor from said primary motor, said restoring means including a clutch between said primary motor and said auxiliary motor, a clutch-closing member, a latch for engaging said member on release of said auxiliary motor, means to move said latch, and thereby said member to close said clutch on completion of a computation, and means for tripping said latch on restoration of power in said auxiliary motor.

36. In a computing machine, the combination with computing mechanism, of an electric motor for actuating said computing mechanism, a normally broken circuit for said motor, an auxiliary motor for completing said circuit, said auxiliary motor being normally restrained from action, numeral keys for controlling the release of said auxiliary motor, and means for restoring power in said auxiliary motor from said electric motor and subsequently opening said circuit.

37. The combination with a computing mechanism, of an electric motor for driving said computing mechanism, an electric circuit for said motor having a normally open switch, an arm connected to close said switch, a cam operating said arm, a spring operating said cam, and numeral keys controlling action of spring.

38. The combination with a computing mechanism, of an electric motor for driving said computing mechanism, an electric circuit for said motor having a normally open switch, an arm connected to close said switch, a cam operating said arm, a spring operating said cam, numeral keys for controlling the operation of said computing mechanism, a latch for preventing the operation of said spring, and means to enable said numeral keys to release said latch.

39. The combination with a computing mechanism, of an electric motor for driving said computing mechanism, an electric circuit to said motor having a normally open switch, an arm connected to close said switch, a cam for operating said arm, a rack connected to said cam, a sector engaging said rack, an arm connected to said sector, a latch on said last-mentioned arm, a lock engaging said latch, a spring for actuating said rack, numeral keys controlling the action of said computing mechanism, and connections enabling any one of said numeral keys to release said latch to enable said spring to act to close said clutch.

40. In a computing machine, the combination with computing mechanism including a computation member having index pins settable therein to determine the amount of movement of said computing mechanism, of a primary motor for actuating said computing mechanism normally ineffective on said computing mechanism, an auxiliary motor for making said primary motor effective, said auxiliary motor being normally restrained from action, numeral keys controlling the release of said auxiliary motor on each stroke of said keys, means for restoring power in said auxiliary motor from said primary motor on the completion of each computation started by a numeral key, said restoring means including a clutch between said primary motor and said auxiliary motor, a clutch-closing member, a shifter for said member, and means for engaging said member on release of said auxiliary motor and moving said shifter into the path of the set index pin, so that said pin on completion of its movement will actuate said shifter and through it said clutch-closing member and clutch to close the same, to connect said primary motor to said auxiliary motor to restore power in the latter.

41. The combination with a typewriting mechanism including a traveling carriage, of a computing mechanism, a series of numeral keys for controlling the action of said computing mechanism, means to enable the return of said numeral keys after having been depressed to start a computation before the computation is completed, and locking means for preventing the movement of said carriage after said numeral keys have been returned to a normal position and before said computation initiated by any one of said numeral keys has been completed.

42. The combination with a computing mechanism, of numeral keys for controlling the action of said computing mechanism, mechanical connections between said numeral keys and said computing mechanism, enabling the operation and control of said computing mechanism by said numeral keys, and means to enable the return of said numeral keys after having been depressed to start a computing action at any time before or after the computing action has been completed, a traveling carriage for determining the denominations of said computing mechanism, and locking means for holding said carriage against movement during a computing action.

43. In a computing machine, the combination with computing mechanism, of a source of power for actuating said computing mechanism, normally ineffective connections between said source of power and said computing mechanism, a spring for rendering said connections effective, said spring being normally restrained from action, numeral keys controlling the release of said spring on each stroke of said numeral keys, and a train of driving connections from said source of power for storing up potential energy in said spring.

44. In a computing machine, the combination with computing mechanism, of a source of power for actuating said computing mechanism, normally ineffective connections between said source of power and said computing mechanism, a spring for rendering said connections effective, said spring being normally restrained from action, means for retensioning said spring before disconnecting said source of power, and means for disconnecting said source of power subsequently to the retensioning of said spring.

45. In a computing machine, the combination with computing mechanism, of a primary motor for actuating said computing mechanism, said computing mechanism including a series of pins settable to determine the extent of a computation, an auxiliary motor normally restrained from action, and numeral keys for controlling the setting of said pins and for releasing said auxiliary motor on each stroke of said keys, said auxiliary motor acting when released by any key to unset a previously set pin.

46. In a computing machine, the combination with computing mechanism including an indexing device having a series of pins settable to determine the extent of a computation, of a primary motor for actuating said computing mechanism normally ineffective on said computing mechanism, an auxiliary motor for making said primary motor effective, said auxiliary motor normally restrained from action, and numeral keys controlling the setting of any pin and for releasing said auxiliary motor, said auxiliary motor also acting to unset a previously set pin.

47. In a computing machine, the combination with a computing mechanism, of a motor for driving said computing mechanism, a train of gearing connecting said motor with said computing mechanism, having a point of interruption whereby said computing mechanism may be disconnected from driven relation with said motor, and a train of gearing driven from said first-mentioned train of gearing at a point intermediate said point of interruption and said motor so as to be fully operative, and connected to break said first-mentioned train of gearing at said point of interruption when a computing action by said computing mechanism is finished.

48. In a computing machine, the combination with indexing mechanism, of a motor for driving said indexing mechanism, a train of gearing connecting said motor with said indexing mechanism, having a point of interruption whereby said mechanism may be disconnected from driven relation with said motor, a train of gearing driven from said first-mentioned train of gearing at a point intermediate said point of interruption and said motor so as to be fully operative, and connected to break said first-mentioned train of gearing at said point of interruption when an action by said indexing mechanism is finished, and a separate source of power for completing said first-mentioned train of gearing at said point of interruption.

49. In a computing machine, the combination with an indexing mechanism, of a motor for driving said mechanism, a train of gearing connecting said motor with said mechanism, having a point of interruption whereby said mechanism may be disconnected from driven relation with said motor, a train of gearing driven from said first-mentioned train of gearing at a point intermediate said point of interruption and said motor so as to be fully operative and connected to break said first-mentioned train of gearing at said point of interruption when an action by said indexing mechanism is finished, a separate source of power for completing said first-mentioned train of gearing at said point of interruption, and means driven by said motor through the intermediary of said second-mentioned train of gearing for storing up energy in said separate source of power.

50. In a computing machine, the combination with an indexing mechanism, of a motor for driving said mechanism, a train of gearing connecting said motor with said mechanism, having a point of interruption, a second train of gearing driven from said first-mentioned train of gearing at a point intermediate said motor and said point of interruption so as to be fully operative and arranged to control the completion or continuity of said first-mentioned train of gearing dependent on the action of said indexing mechanism, and means for breaking the continuity of said second-mentioned train of gearing after it has completed a controlling action of said first-mentioned train of gearing.

51. In a computing machine, the combination with an indexing mechanism, of a motor for driving said mechanism, a train of gearing connecting said motor with said mechanism and having a point of interruption, a second train of gearing driven from said first train of gearing for controlling the continuity of said first train of gearing at said point of interruption, and means for automatically bringing said second train of gearing into effective action to control the continuity of said first train of gearing at a predeterminded point in an action of said indexing mechanism.

52. In a computing machine, the combination with an indexing mechanism, of a motor for driving said mechanism, a train of gearing connecting said motor with said mechanism and having a point of interruption, a second train of gearing driven from said first train of gearing for controlling the continuity of said first train of gearing at said point of interruption, and means for automatically bringing said second train of gearing into effective action to control the continuity of said first train of gearing at a predetermined point in an indexing action of said indexing mechanism, said second train of gearing automatically severing the mastery over said first train of gearing after it has completed a controlling action thereof.

53. In a computing machine, the combination with an indexing mechanism, of a motor for driving said mechanism, a train of gearing connecting said motor with said mechanism, a second train of gearing driven from said first train of gearing, and means operated by said mechanism during an indexing action enabling said second-mentioned train of gearing to automatically control the effectiveness of said first-mentioned train of gearing to drive said indexing mechanism.

54. The combination with a computing mechanism, of a carriage traveling to control the denominations of said computing mechanism, an escapement for controlling the movements of said carriage, numeral keys for controlling the action of said escapement and the action of said computing mechanism, and locking means for said escapement controlled from said computing mechanism.

55. In a combined typewriting and computing machine, the combination with a plurality of computing heads and a typewriter carriage, one of said computing heads being mounted on the carriage and the other being mounted for reciprocation with respect to said carriage, of master means coöperating with each computing head, numeral keys controlling the extent of movement of said master means, and means to prevent movement of either of said master means to effect a computing action when either one of said computing heads and its corresponding master means are not in correct register, the one with the other.

56. In the computing machine, the combination with a primary indexing mechanism, of a motor for driving said mechanism, a clutch for controlling the drive of said mechanism by said motor, and a second clutch for controlling the open or closed condition of said first clutch.

57. The combination with a computing mechanism, of a motor for driving said mechanism, a clutch having a variable period of action for determining a variable period of drive of said computing mechanism by said motor, and a single-acting clutch having a definite period of effectiveness for controlling the effectiveness of said first-mentioned clutch.

58. The combination with one or more computing sets, each including a series of computing wheels and a master wheel for driving said computing wheels *seriatim*, said master wheel and said computing wheels having a relative traveling movement to bring said master wheel into successive register with each of said computing wheels, of an indexing device for controlling the extent of rotation of said master wheel, said indexing device including a series of pins settable to determine the extent of movement thereof and normally having a pin set to determine the passivity of said indexing device, numeral keys controlling the setting of any pin, means also controlled by said keys for upsetting said set pin, and locking means for preventing the unsetting of said pin by said last-mentioned means when any of said master wheels is not in exact register with one of the accordant computing wheels, while leaving said keys free to set a pin.

59. The combination with a computing set including two primary elements, to wit, a series of computing wheels and a master wheel, said primary elements having a relative traveling movement to bring said master wheel into successive register with each of said computing wheels, of a motor for driving said master wheel, numeral keys for controlling the drive of said master wheel by said motor, a switch closable at the actuation of a numeral key to complete the circuit to said motor and start the same in action, and locking means for preventing the closing of said switch when said master wheel overlaps more than one computing wheel, while leaving said keys free to control the drive of said master wheel by said motor.

60. The combination with a computing mechanism including two primary elements, to wit, a series of computing wheels and a master wheel, said master wheel and said computing wheels having a relative traveling movement to bring said master wheel into successive register with each of said computing wheels, of a motor for driving said computing mechanism, numeral keys for determining how far the computing mechanism shall be driven by said motor, and means for preventing the drive of said computing mechanism by said motor when said master wheel overlaps more than one computing wheel, while leaving said keys free to determine how far the computing mechanism shall be driven.

61. The combination with a computing mechanism including two primary elements, to wit, a series of computing wheels and a master wheel, said primary elements having a relative traveling movement to bring said master wheel into successive register with each of said computing wheels, of a motor for driving said computing mechanism, said motor being normally silent, a train of gearing connecting said motor to said computing mechanism, said train of gearing being normally interrupted, indexing devices to determine how far said computing mechanism shall be driven, a series of numeral keys for setting any indexing device and for controlling both the completion of said train of gearing and the inciting of said motor to action, and locking means for preventing the completion of said train of gearing and the inciting of said motor to action when said master wheel overlaps more than one computing wheel, while leaving said keys free to control said indexing devices.

62. In a computing machine, the combination with an indexing mechanism, of a motor for driving said mechanism, a train of gearing from said motor to said mechanism, being normally interrupted, a clutch for completing said train of gearing, a circuit to said motor and normally interrupted, a switch for closing said circuit, a series of numeral keys for controlling the action of said indexing mechanism, means for concomitantly closing said clutch and said switch at the down stroke of a numeral key, mechanism for shifting said means out of action, and connections actuated by said indexing mechanism to enable the actuation of said last-mentioned mechanism at the completion of each operation of said indexing mechanism.

63. In a computing machine, the combination with an indexing mechanism, of a motor for driving said mechanism, a train of gearing from said motor to said mechanism, being normally interrupted, a clutch for completing said train of gearing, a circuit to said motor and normally interrupted, a switch for closing said circuit, a series of numeral keys for controlling the action of said indexing mechanism, means for concomitantly closing said clutch and said switch at the down stroke of a numeral key, mechanism for shifting said means out of action, connections actuated by said indexing mechanism to enable the actuation of said last-mentioned mechanism at the completion of each operation of said indexing mechanism, and means for rendering said connections ineffective after having completed their functions.

64. In a computing machine, the combination with a computing mechanism, of a motor for driving said computing mechanism, an indexing mechanism to determine the amount of movement of said computing mechanism by said motor, a normally open train of connections between said motor and said indexing mechanism, a clutch for closing said train of connections, a series of numeral keys for controlling the action of said indexing mechanism, and means for closing said clutch at the actuation of any numeral key at a predetermined point in the down stroke of such key.

65. In a computing machine, the combination with a computing mechanism, of a motor for driving said computing mechanism, an indexing mechanism to determine the amount of movement of said computing mechanism by said motor, a normally open train of connections between said motor and said indexing mechanism, a clutch for closing said train of connections, a series of numeral keys for controlling the action of said indexing mechanism, means for closing said clutch at the actuation of any numeral key at a predetermined point in the down stroke of such key, and means for opening said clutch at the completion of a computation irrespective of the further movement of the actuated numeral key after the closing of said clutch.

66. In a computing machine, the combination with a computing mechanism, of a motor for driving said computing mechanism, an indexing mechanism to determine the amount of movement of said computing mechanism by said motor, a normally open train of connections between said motor and said indexing mechanism, a clutch for closing said train of connections, a series of numeral keys for controlling the action of said indexing mechanism, means for closing said clutch at the actuation of any numeral key at a predetermined point in the down stroke of such key, and means driven from said motor and controlled from said computing mechanism for opening said clutch at the end of a computation.

67. In a computing machine, the combination with a computing mechanism, of a motor for driving said computing mechanism, an indexing mechanism to determine the amount of movement of said computing mechanism by said motor, a normally open train of connections between said motor and said indexing mechanism, a clutch for closing said train of connections, a series of numeral keys for controlling the action of said indexing mechanism, means for closing said clutch at the actuation of any numeral key at a predetermined point in the down stroke of such key, and means to enable said computing mechanism, as it comes to rest, to open said clutch and silence the drive from said motor to said computing mechanism.

68. The combination with a computing mechanism including a member mutilatable to determine the instant of silencing of said computing mechanism, a motor for driving said computing mechanism and said mutilatable member, a train of gearing from said motor to said mutilatable member, said train of gearing being normally interrupted, a clutch for completing said train of gearing, and means controlled from said mutilatable member for opening said clutch as the mutilated portion of said member comes into mesh with said train of gearing.

69. The combination with a computing mechanism, of a series of numeral keys for controlling the action of said computing mechanism, a motor for driving said computing mechanism, a normally interrupted train of gearing between said motor and said computing mechanism, a clutch for completing said train of gearing, said motor being normally silent, a switch for starting said motor into action, said computing mechanism including an indexing device having a series of index pins settable to determine the extent of computation by said computing mechanism, and means brought into play at the actuation of a numeral key for connecting up said indexing device in driven relation with said train of gearing, for closing said clutch and switch during the down stroke of such key.

70. In a computing machine, the combination with an indexing mechanism, of a source of power for said mechanism, connecting means between said source of power and said mechanism normally ineffective, numeral keys for controlling the action of said indexing mechanism, auxiliary power means normally tending to actuate said connecting means to render the same effective so as to enable said source of power to drive said indexing mechanism, and tripping means actuated by each of said numeral keys when operated for releasing said auxiliary power means and bringing the same into play.

71. In a computing machine, the combination with an indexing mechanism, of a source of power for driving said mechanism, a normally-open clutch for connecting said source of power with said mechanism, numeral keys for controlling the action of said indexing mechanism, auxiliary power means ready to close said clutch, a lock for said means, and a trip for said lock controlled from said numeral keys at the actuation of each of them so as to close said clutch and connect said indexing mechanism in driven relation with said source of power.

72. In a computing machine, the combination with an indexing mechanism, of a source of power for driving said mechanism, a clutch for controlling the drive of said mechanism by said source of power, said clutch being normally open, a spring normally under a tension tending to throw said clutch, locking means for restraining said spring, a series of numeral keys controlling the action of said indexing mechanism, and means universal to all of said keys for releasing said locking means at the actuation of each of said keys to permit said spring to act to release said clutch.

73. In a computing machine, the combination with a computing mechanism, of a source of power for driving said computing mechanism, a clutch for controlling the drive of said computing mechanism by said source of power, said clutch being normally open, a spring normally under a tension tending to throw said clutch, locking means for restraining said spring, a series of numeral keys controlling the action of said computing mechanism, means universal to all of said keys for releasing said locking means at the actuation of any one of said keys to permit said spring to act to close said clutch, and means operated from said computing mechanism for overcoming the tension on said spring to open said clutch at the end of a computing operation irrespective of the position of the numeral key which caused the closing of said clutch.

74. In a computing machine, the combination with a series of computing wheels, of a series of numeral keys, a single valuating mechanism common to all of said computing wheels to determine the extents of individual rotation thereof and controlled by all of said numeral keys to be set thereby according to the values of the numeral keys actuated, a source of power for driving said valuating mechanism, normally disconnected therefrom, and auxiliary power means for making a connection between said source of power and said valuating mechanism, said auxiliary power means doing the actual work of making the connection and being tripped into action by said numeral keys on their down strokes.

75. In a computing machine, the combination with a series of computing wheels, of a series of numeral keys, a single valuating mechanism common to all of said computing wheels to determine the extents of individual rotation thereof and controlled thereby according to the values of the numeral keys actuated, a source of power for driving said valuating mechanism, normally disconnected therefrom, an auxiliary source of power brought into action by any one of said numeral keys for relieving said numeral keys of the actual work of making the connection between said first-mentioned source of power and said valuating mechanism so that said valuating mechanism will be driven by said first-mentioned source of power concomitant with the actuation of any numeral key, and means independent of the subsequent position or condition of the actuated numeral key, for interrupting the connection between said valuating mechanism and said first-mentioned source of power.

76. In a computing machine, the combination with valuating mechanism, of a motor for driving said valuating mechanism, normally disconnected therefrom, a normally-open circuit for said motor, said valuating mechanism being normally disabled aside from its setting to arrange for a valuating action, an auxiliary power mechanism for connecting up said motor in driving relation with said valuating mechanism for closing the circuit to said motor and for reënabling said valuating mechanism to act, and numeral keys connected to merely set said valuating mechanism and incite said auxiliary power mechanism to action, said auxiliary power mechanism doing the actual work of completing the connection of the motor to the valuating mechanism, completing the circuit to the motor, and reëstablishing said valuating mechanism.

77. In a computing machine, the combination with valuating mechanism, of a motor for driving said valuating mechanism, a normally open circuit to said motor, auxiliary mechanism for closing said circuit, and numeral keys controlling said valuating mechanism and connected to bring said auxiliary mechanism into play on the down-strokes of the keys, said auxiliary mechanism relieving said numeral keys of the actual work of completing the circuit to said motor.

78. The combination with a computing unit including a series of computing wheels and a master wheel, said computing wheels and said master wheel having a relative step-by-step movement so that said master wheel may drive said computing wheels *seriatim*, of a lock for preventing a relative step-by-step movement between said computing wheels and said master wheel while said master wheel is rotating to drive one of said computing wheels, and numeral keys connected to control the rotation of said master wheel and the bringing into play of said lock, the connections from said numeral keys to said master wheel and said lock being of a clearing kind so that said numeral keys can return to a normal position after bringing said lock into play and after starting a rotation of said master wheel while said lock is still in play and while said master wheel still rotates.

79. In a computing machine, the combination with a valuating mechanism, of a primary source of power for said mechanism normally disconnected therefrom, means for connecting said valuating mechanism to said source of power, an auxiliary source of power for operating said connecting means, numeral keys for controlling said auxiliary source of power, means for restoring power in said auxiliary source of power including a normally interrupted train of gearing from said primary source of power, and means controlled from said valuating mechanism for completing said train of gearing.

80. In a computing machine, the combination with computing wheels, of a valuating mechanism to determine the amount of movement of said wheels, a source of power normally disconnected from said valuating mechanism, driving means operated by said valuating mechanism to run into one of said computing wheels the digit corresponding to the key actuated, an auxiliary power means to connect said source of power to said valuating mechanism, a locking means normally preventing action of said auxiliary power means, and connections operated by each of said numeral keys to release said locking means.

81. In a computing machine, the combination with numeral keys and a plurality of computing wheels, of valuating mechanism for governing the movement of said wheels, driving mechanism for operating said computing wheels as determined by said valuating mechanism, means for starting an action of said driving mechanism, means controlled by said numeral keys for bringing said starting means into action, and connections other than said numeral keys for bringing said starting means to ineffective position.

82. In a computing machine, the combination with computing mechanism including an indexing device having a plurality of settable pins to determine the extent of movement of said computing mechanism, of spring-actuated restoring means for said pins operating at a single point in the path of movement of said pins to unset a previously set pin, a plurality of numeral keys, and means controlled by all of said numeral keys for controlling said spring-actuated means to release the same.

83. In a computing machine, the combination with computing mechanism, of driving means therefor, a computation wheel for determining the extent of movement of said computing mechanism, said wheel having a series of pins constituting a mutilatable gear, numeral keys for setting any of said pins to thereby mutilate said gear, the set pin serving as a stop, which pin must be reset to again complete said gear to start a computation, power means other than said numeral keys brought into play thereby to reset any of said pins to thereby start a computation, and a train of connections enabling said driving means to reënergize said power means between the actuations of said numeral keys.

84. The combination with a computing mechanism, of a motor for driving said computing mechanism, an electric circuit for said motor normally open at one point, means for closing said circuit to enable the incitation of said motor, means for returning said circuit closing means to normal position, and mechanism rendered effective by said returning means for preventing the opening of said circuit irrespective of the position of said circuit closing means until each individual computing operation is entirely completed.

85. The combination with a computing mechanism, of a motor for driving said computing mechanism, said motor being normally dormant, numeral keys for controlling the action of said computing mechanism, a switch for closing the circuit to said motor to enable the incitation of the same to action, connections enabling the closure of said switch at the depression of a numeral key but independently of the power applied thereto, and means for maintaining said switch closed subsequent to the return of the closing numeral key, and until the computation started by the key is completed.

86. In a combined typewriting and computing machine, the combination with a plurality of computing heads and a typewriter carriage, one of said computing heads being mounted on the carriage, and the other being mounted for reciprocation with respect to the carriage, of master means coöperating with each computing head, numeral keys controlling the extent of movement of said master means, locking means individual to each computing head to prevent relative movement between the computing head and master means during a computing operation, and means common to said individual locking means brought into play at the actuation of each numeral key to render both said locking means effective.

87. In a computing machine, the combination with computing mechanism, of a source of power for driving it normally disconnected, numeral keys, and means to enable any numeral key to control the making of the connection between said source of power and said computing mechanism, to thereby drive said computing mechanism on the down-stroke of any key, said means including a computation wheel having a series of pins constituting a mutilated gear, and jacks for setting said pins, said jacks being loosely mounted, so as to permit them to be cammed out of the path of the pins, while said wheel is being rotated on the down-stroke of any key and before the key and jack have been moved to retracted position.

88. The combination with computing mechanism, of power means for actuating said computing mechanism, an auxiliary source of power for controlling the actuation of said power means, mechanism for storing up energy in said source of power including a driving element, a driven element, a clutch connection between said driving and said driven elements, a clutch-closer for said clutch connection, a cam on said driven element connected to store up energy in said auxiliary source of power, a latch connected to said clutch-closer, a shifter engaging said latch to control said clutch-closer, and a second cam on said driven element engaging said latch to disconnect the same from said shifter at the termination of the action of said driven element to enable the disconnection of said driven element from said driving element.

89. The combination with a valuating mechanism, of a mechanism tending to bring said valuating mechanism into play, locking means for preventing the operation of said second mentioned mechanism, a series of numeral keys, and tripping mechanism operable by any one of said numeral keys to release said locking mechanism and permit the action of said second mentioned mechanism so as to bring said valuating mechanism into play.

90. The combination with valuating mechanism for determining the extent of a computing action, of a series of numeral keys, mechanism normally tending to act for setting said valuating mechanism according to the indication of an operated numeral key, and tripping means actuable by any of said numeral keys for releasing said second mentioned mechanism, to set and bring into play said valuating mechanism.

GUSTAVE O. DEGENER.

Witnesses:
J. E. LUCAS,
D. L. BAYLIS.